United States Patent [19]

Zhang et al.

[11] Patent Number: 5,735,128
[45] Date of Patent: Apr. 7, 1998

[54] CRYOGENIC REFRIGERATOR DRIVE

[75] Inventors: Yueli Zhang, Medfield; Ronald Norman Morris, North Falmouth; David Christopher Giusti, Mansfield, all of Mass.

[73] Assignee: Helix Technology Corporation, Mansfield, Mass.

[21] Appl. No.: 729,572

[22] Filed: Oct. 11, 1996

[51] Int. Cl.$^6$ ........................................ F25B 9/00
[52] U.S. Cl. ................................... 62/6; 60/518
[58] Field of Search ............................. 62/6; 60/518

[56] References Cited

U.S. PATENT DOCUMENTS

| | | | |
|---|---|---|---|
| 3,274,795 | 9/1966 | Fowle et al. | 62/403 |
| 3,312,239 | 4/1967 | Chellis | 137/560 |
| 3,413,862 | 12/1968 | Waara | 74/53 |
| 3,742,719 | 7/1973 | Lagodmos | 60/518 |
| 4,069,724 | 1/1978 | Sobotta | 74/569 |
| 4,092,829 | 6/1978 | Durenec | 60/517 |
| 4,248,050 | 2/1981 | Durenec | 62/6 |
| 4,365,982 | 12/1982 | Durenec | 62/6 |
| 4,404,808 | 9/1983 | Andeen | 62/6 |
| 4,543,793 | 10/1985 | Chellis et al. | 62/6 |
| 4,550,571 | 11/1985 | Bertsch | 62/6 |
| 4,570,500 | 2/1986 | Richter | 74/54 |
| 4,584,839 | 4/1986 | Jensen et al. | 62/6 |
| 4,610,143 | 9/1986 | Stolfi et al. | 62/6 |
| 4,667,531 | 5/1987 | Kato et al. | 74/567 |
| 4,697,113 | 9/1987 | Young | 310/15 |
| 4,718,162 | 1/1988 | Schuppert, Jr. et al. | 29/741 |
| 4,761,960 | 8/1988 | Higham et al. | 62/6 |
| 4,783,968 | 11/1988 | Higham et al. | 62/6 |
| 4,819,439 | 4/1989 | Higham | 62/6 |
| 4,856,358 | 8/1989 | Montalbano | 74/84 R |
| 5,022,229 | 6/1991 | Vitale | 62/6 |
| 5,076,769 | 12/1991 | Shao | 417/534 |
| 5,103,647 | 4/1992 | Ackermann | 62/6 |
| 5,337,623 | 8/1994 | Huang et al. | 74/813 R |
| 5,442,913 | 8/1995 | Cho et al. | 60/518 |
| 5,533,335 | 7/1996 | Shin | 60/517 |

OTHER PUBLICATIONS

M.F. Spotts, Design of Machine Elements, 6$^{th}$ ed. Brentice Hall 1985, p. 588.

Breckenridge, Jr., et al., "Development of Rotary–Reciprocating Cryogenic Refrigerator for Space Applications," Air Force Dynamics Laboratory, Technical Report AFFDL–TR–72–88, pp. 25–27 and 45 (Jul. 1972).

Norton, R. L., "Design of Machinery—An Introduction to the Synthesis and Analysis of Mechanisms and Machines," pp. 294–339, (1992).

Primary Examiner—Christopher Kilner
Attorney, Agent, or Firm—Hamilton, Brook, Smith & Reynolds, P.C.

[57] ABSTRACT

A drive for driving a displacer in a cryogenic refrigerator includes a rotatable cam having a cam surface. The cam is rotatable about a pivot point with a cam follower contacting the cam surface. Rotational motion of the cam is converted into reciprocating motion of the cam follower. A displacer rod is coupled between the cam follower and the displacer for transferring the reciprocating motion of the cam follower to the displacer for driving the displacer.

29 Claims, 8 Drawing Sheets

CRYOGENIC REFRIGERATOR DRIVE

BACKGROUND

Cryogenic refrigerators commonly operate by reciprocating a displacer within an expansion chamber to expand pressurized helium therein. The displacer is typically driven by a Scotch Yoke mechanism such as that disclosed in U.S. Pat. No. 3,312,239 and described below.

Referring to FIG. 1, a Scotch Yoke mechanism 10 includes a rotating drive crank 12 which is coupled to a drive motor (not shown) rotating about a rotation point O. A bearing 14 is mounted to the drive crank 12 at a distance r away from the rotation point O. Bearing 14 is slidably captured within yoke 16. A displacer rod 18 having a rear portion 18a and a front portion 18b is secured to opposite sides of yoke 16. Displacer rod 18 is supported by a rear linear bearing 20 on rear portion 18a and by a front linear bearing 26 on front portion 18b. Front portion 18b is coupled to displacer 22 which reciprocates within expansion chamber 24 of the refrigerator. Rotation of the drive crank 12 causes the bearing 14 to drive yoke 16 and displacer 22 in a reciprocating motion as bearing 14 slides within yoke 16. The Scotch Yoke mechanism 10 drives displacer 22 with a true harmonic motion, thereby minimizing vibration.

SUMMARY OF THE INVENTION

A drawback of the Scotch Yoke mechanism 10 is that at particular crank angles of drive crank 12, bearing 14 exerts high side loads on yoke 16 in directions perpendicular to the reciprocating motion of the yoke 16. Due to the high side loads, the displacer rod 18 must be supported on opposite sides of the yoke 16 by bearings 20 and 26, thereby increasing the size of the drive.

The present invention provides a compact drive for driving a displacer in a cryogenic refrigerator with a true harmonic motion which exerts low side loads on the displacer rod. The present inventive drive includes a cam that is rotatable about a pivot point and which has a first rotatable cam surface for contacting a first cam follower. Rotational motion of the cam is converted into reciprocating motion of the first cam follower. A first displacer rod is coupled between the first cam follower and the first displacer for transferring the reciprocating motion of the first cam follower to the first displacer for driving the first displacer.

In preferred embodiments, the first displacer rod is preferably supported by only one linear motion bearing. In addition, the first cam follower is a roller having a center about which the roller is rotatable. The first cam surface is an internal surface of a groove formed on a face of the cam, the groove capturing the first cam follower. The first cam surface drives the cam follower with a true harmonic motion and has a profile which is determined by the equation:

$$R(\theta) = \sqrt{l^2 + r^2\sin^2\theta}$$

where R is the cam radius measured from a cam center, $\theta$ is the rotational angle of the cam, l is a configuration constant, and r is equal to ½ stroke of the displacer which is also the distance between the cam center and the pivot point.

The low side loads exerted by the present invention drive on the displacer rod make it possible to employ only one bearing, thereby making the drive more compact and providing less friction forces on the displacer rod.

In another preferred embodiment, the drive further includes a second rotatable surface on the cam. A second cam follower contacts the second cam surface. Rotational motion of the cam is converted into reciprocating motion of the second cam follower. A second displacer rod is coupled between the second cam follower and a second displacer for transferring the reciprocating motion of the second cam follower to the second displacer for driving the second displacer.

The first and second cam surfaces are preferably located on respective first and second faces of the cam and are positioned 180° out of phase relative to each other such that the first and second displacers are reciprocated outwardly and inwardly in unison. The first and second cam surfaces each have a profile which is determined by the equation $$R_p(\theta) = R_0 + \frac{r_o}{2}(1 - \cos\theta)$$

where $R_p$ is the cam radius measured from the cam pivot or rotation point, $\theta$ is the rotational angle of the cam, $R_o$ is the radius of the prime circle of the cam and $r_o$ is the stroke of the displacer.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 2:
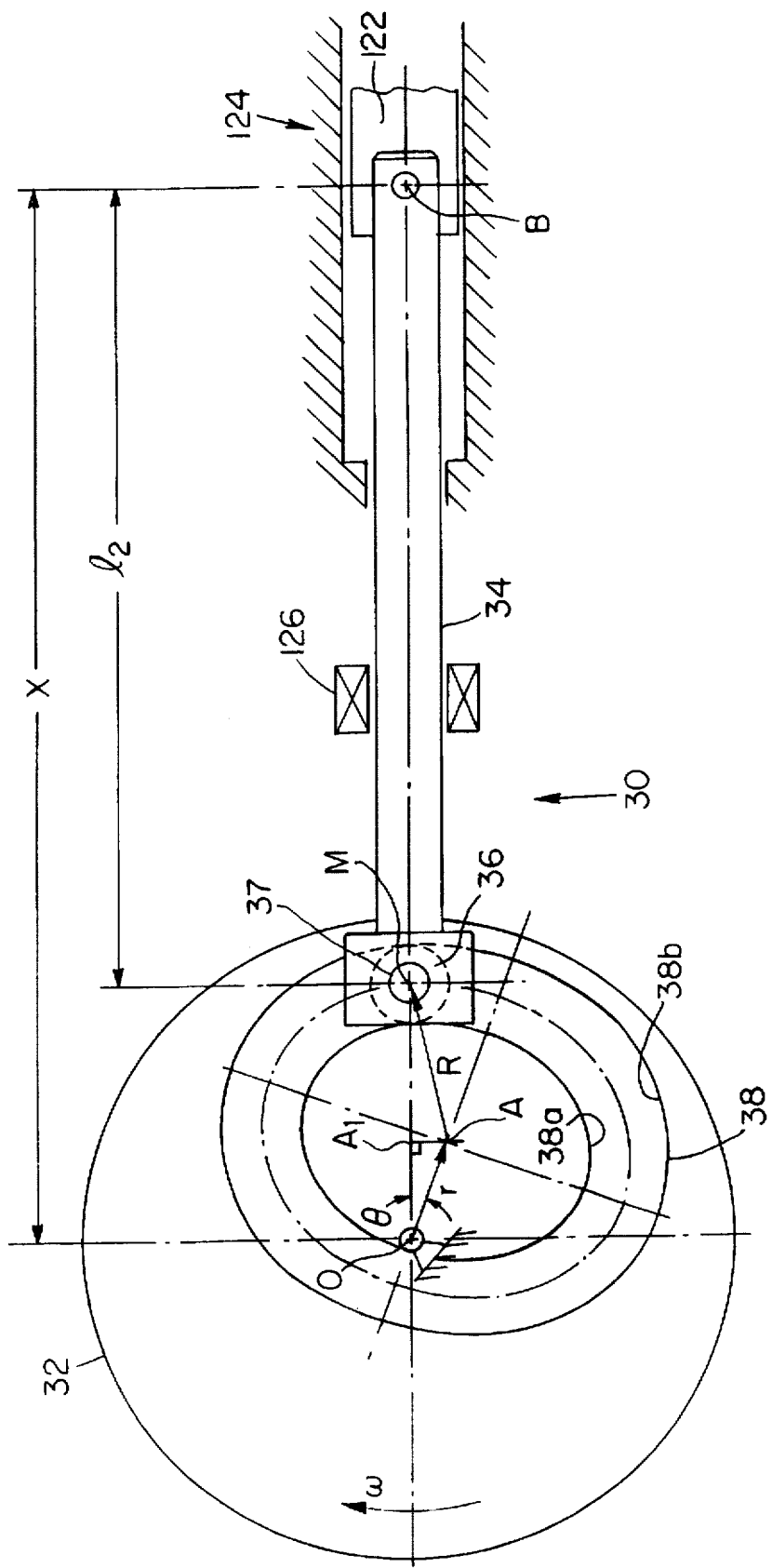
FIG. 2 is a schematic drawing of the present invention drive.

Referring to FIG. 2, displacer drive 30 of the present invention reciprocates a displacer 122 within an expansion chamber 124 of a cryogenic refrigerator such as a Gifford-McMahon refrigerator. Pressurized helium gas introduced into expansion chamber 124 is expanded on the back stroke of displacer 122 which causes cooling of the helium and the refrigerator. Displacer drive 30 includes a face cam 32 having a cam groove 38 for capturing and driving cam follower 36. Cam groove 38 includes an inner cam surface 38a and an outer cam surface 38b. Cam follower 36 typically includes a rotatable roller that is supported by a shaft 37 extending transversely from a displacer rod 34. The displacer rod 34 is coupled between cam follower 36 and displacer 122. The use of cam groove 38 eliminates the need for a spring to bias cam follower 36 against the cam 32 as cam 32 rotates. A single linear bearing 126 supports displacer rod 34 during reciprocation.

Cam 32 exerts low side loads on displacer rod 34. The low side loads also makes it possible to support displacer rod 34 with only one bearing 126. This makes displacer drive 30 more compact than Scotch Yoke mechanism 10 since one bearing is eliminated.

Figure 1:
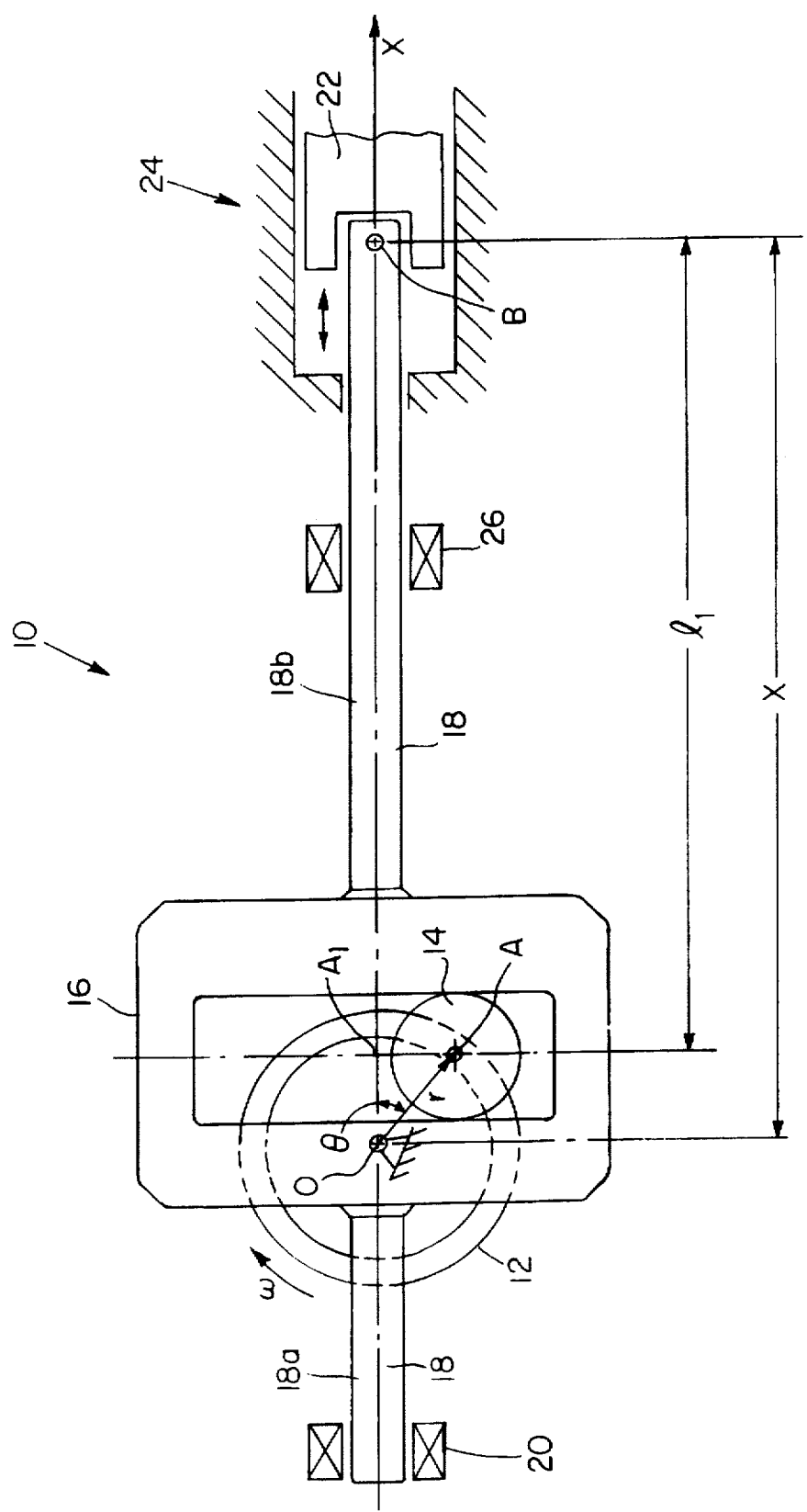
FIG. 1 is a schematic drawing of a prior art Scotch Yoke drive.

In order for displacer drive 30 to be suitable for use in a cryogenic refrigerator, cam 32 should drive the displacer 122 with a true harmonic motion. The manner in which cam 32 drives displacer 122 is dependent upon the profile of cam surfaces 38a and 38b of cam groove 38. If the profile for cam surfaces 38a and 38b is not properly chosen, displacer drive 30 will have vibration problems. It is preferable for cam 32 to reciprocate displacer 122 with the same harmonic motion provided by the Scotch Yoke mechanism depicted in FIG. 1 because such a motion minimizes vibration.

Consequently, a profile for cam surfaces 38a and 38b must be determined which provides the same motion as the Scotch Yoke mechanism. In order to do this, first, the motion provided by the Scotch Yoke mechanism 10 must be mathematically defined. Referring to Scotch Yoke mechanism 10 in FIG. 1, the distance X between point B (located at the coupling point between displacer 22 and displacer rod 18) and rotation or pivot point O of drive crank 12, is defined at any angular position of drive crank 12 by the following equation:

$$X = OA_1 + l_1 \quad \text{(Eq. 1)}$$

where:

$OA_1$=the length of the line segment between rotation point O and point $A_1$ and $l_1$=the distance between point $A_1$ and point B at the displacer rod 18 and displacer 22 coupling point.

Using Trigonometry, Equation 1 can also be expressed as:

$$X = OA \cos\theta + l_1 \quad \text{(Eq. 2)}$$

where:

OA=the length of the line segment between rotation point O and point A (which is also the crank length r of drive crank 12), and θ=the rotational angle of drive crank 12.

Substituting r for OA and ωt for θ into Equation 2 results in:

$$X = r \cos\omega t + l_1 \quad \text{(Eq. 3)}$$

where:

ω=the angular velocity of drive crank 12, and t=time.

Equation 3 defines the distance X for Scotch Yoke mechanism for any given crank angle of drive crank 12 and provides pure harmonic motion for a constant angular velocity ω.

Next, the motion provided by a cam driven mechanism is mathematically defined. Referring to displacer drive 30 in FIG. 2, the distance X between rotation point O and point B is defined as:

$$X = OA_1 + A_1M + l_2 \quad \text{(Eq. 4)}$$

where $l_2$ is the distance between point M at the center of cam follower 36 and point B at the displacer rod 34 and displacer 122 coupling point, and where $OA_1$ and $A_1M$ are line segments which can also be expressed as:

$$A_1M = \sqrt{R^2(\theta) - r^2 \sin\theta} \quad \text{(Eq. 6)}$$

where:

θ=the rotational angle of cam 32

R(θ)=the cam trajectory radius measured from the center point A of cam groove 38 for any given rotational angle θ of cam 32, and r=the distance between rotation point O and point A, the center of the cam trajectory.

Substituting Equations 5 and 6 into Equation 4 results in:

$$X = r\cos\theta + \sqrt{R^2(\theta) - r^2\sin\theta} + l_2 \quad \text{(Eq. 7)}$$

Equation 7 can also be written as:

$$X = r\cos\theta + R(\theta)\sqrt{1 - \left(\frac{r}{R(\theta)}\right)^2 \sin\theta} + l_2. \quad \text{(Eq. 8)}$$

By substituting θ with ωt, Equation 8 can be rewritten as:

$$X = r\cos\omega t + R(\omega t)\sqrt{1 - \left(\frac{r}{R(\omega t)}\right)^2 \sin^2\omega t} + l_2. \quad \text{(Eq. 9)}$$

Equation 9 defines the distance X of displacer drive 30 at any given rotational position of cam 32.

In order to define the cam surfaces 38a and 38b of cam 32 so that displacer drive 30 produces a true harmonic motion as in the Scotch Yoke mechanism 10, Equation 3 for Scotch Yoke mechanism 10 and Equation 9 for a cam driven mechanism are made equal to each other as follows:

$$r\cos\omega t + l_1 = r\cos\omega t + R(\omega t)\sqrt{1 - \left(\frac{r}{R(\omega t)}\right)^2 \sin^2\omega t} + l_2.$$

Equation 10 reduces to:

$$l_1 = R(\omega t)\sqrt{1 - \left(\frac{r}{R(\omega t)}\right)^2 \sin^2\omega t} + l_2. \quad \text{(Eq. 11)}$$

Substituting the configuration constant l for $l_1 - l_2$ in Equation 11 and reducing results in:

$$l = \sqrt{R^2(\omega t) - r^2 \sin^2 \omega t}. \quad \text{(Eq. 12)}$$

Squaring both sides of Equation 12 and rearranging results in:

$$R^2(\omega t) = l^2 + r^2 \sin^2 \omega t. \quad \text{(Eq. 13)}$$

Solving for R(ωt) results in:

$$R(\omega t) = \sqrt{l^2 + r^2 \sin^2 \omega t}. \quad \text{(Eq. 14)}$$

Substituting θ for wt in Equation 14 brings:

$$R(\theta) = \sqrt{l^2 + r^2 \sin^2 \theta}. \quad \text{(Eq. 15)}$$

Equation 15 provides the cam trajectory radius R measured from point A for any given crank angle θ of cam 32 about rotation point O. By determining the radius R at any angle θ, the profile for cam surfaces 38a and 38b can be easily determined since the radius R is also along the center line of the path of the cutting tool used to cut cam groove 38 when cam 32 is manufactured. Groove 38 is preferably cut by a CNC milling machine. In one preferred embodiment, r which is ½ the stroke of the displacer is about 0.5 inches while the configuration constant l is about 0.75 inches.

Alternatively, the dimensions of r and l can be varied depending upon the stroke of the displacer and the dimensions of the drive unit. However, l should not be less than r because unsuitable cam profiles having sudden displacement changes result when r>l.

Figure 3:
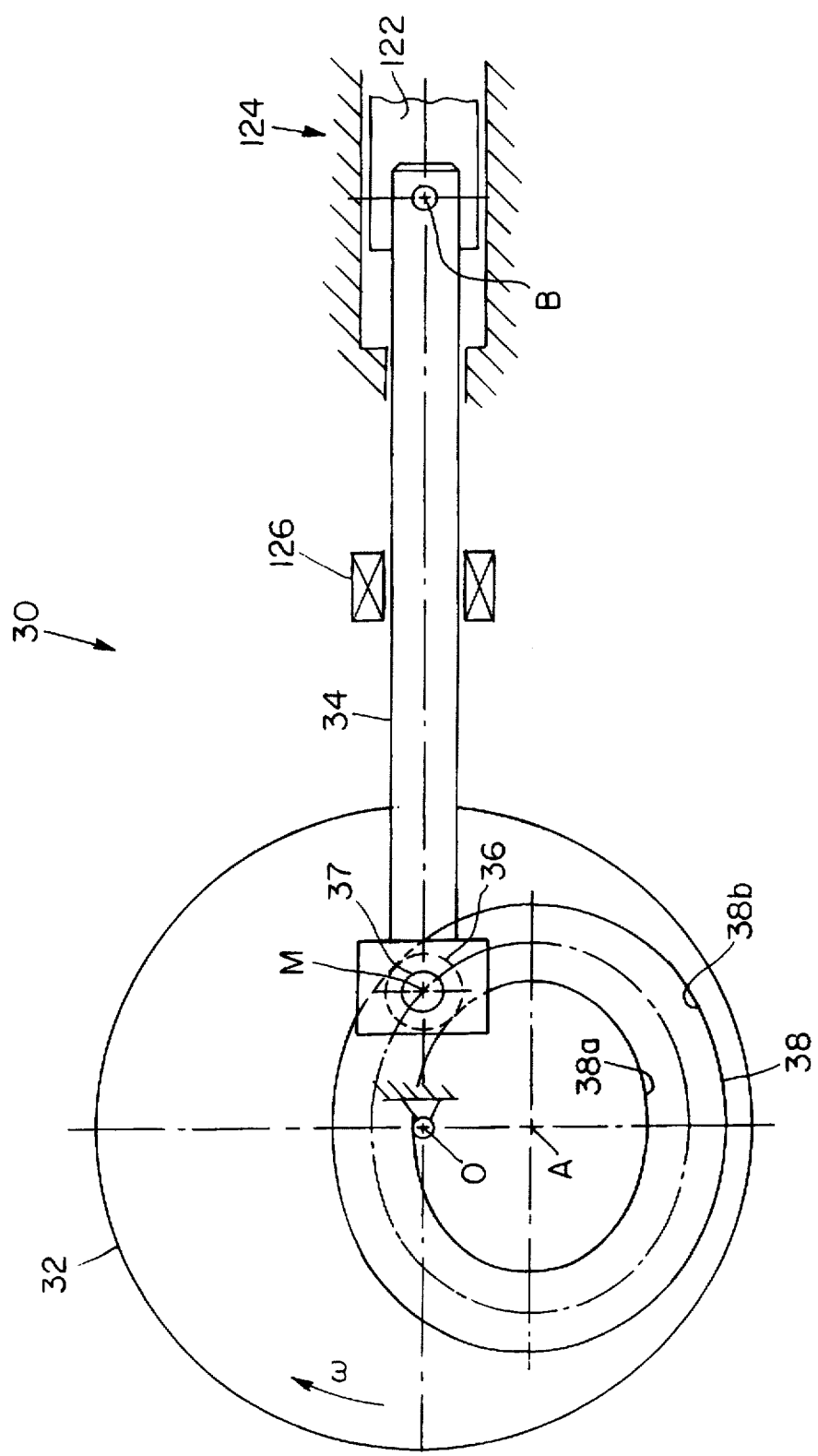
FIGS. 3, 4 and 5 depict the drive of FIG. 2 with the cam rotated at different rotational angles.
Figure 4:
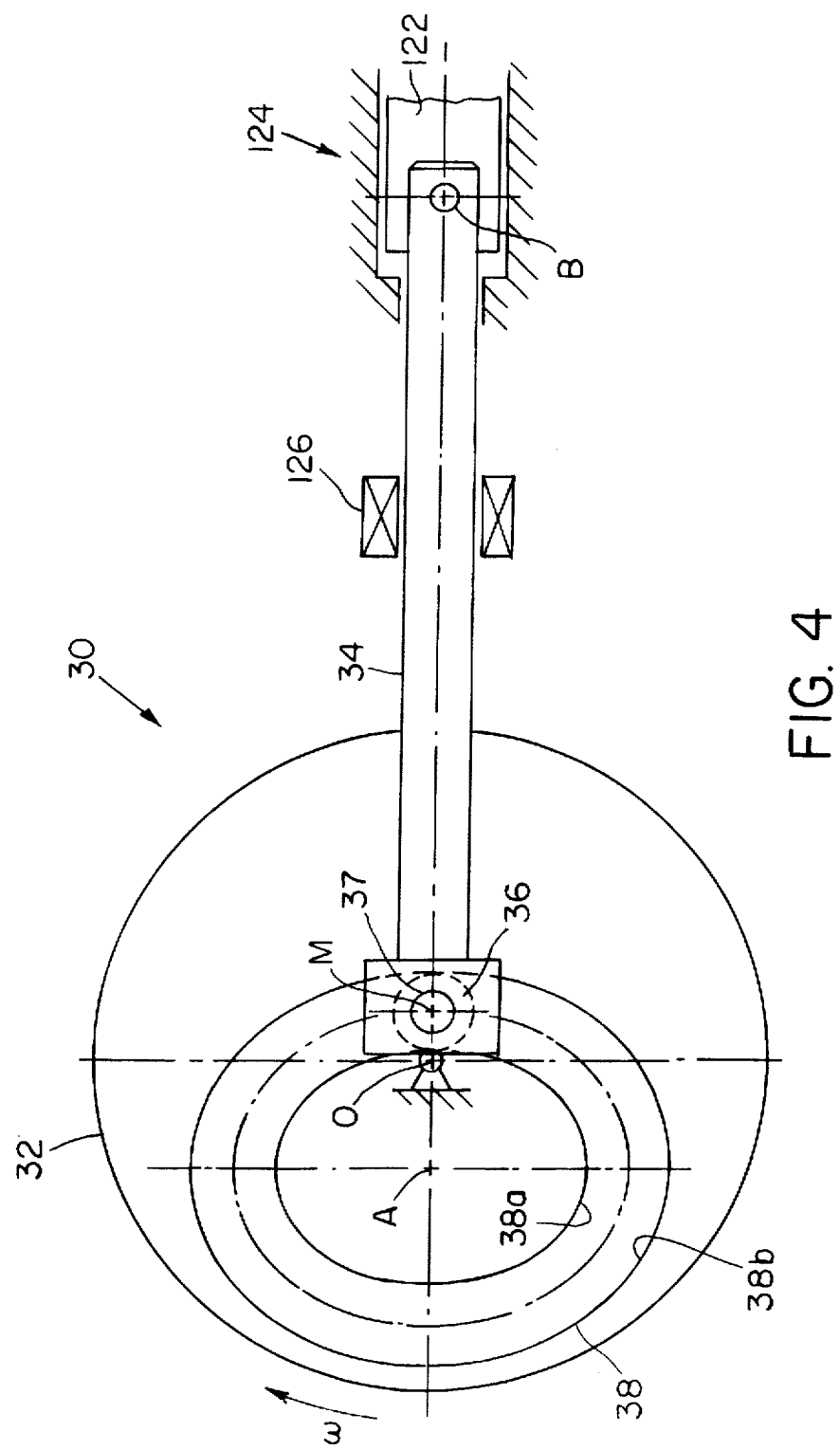
Figure 5:
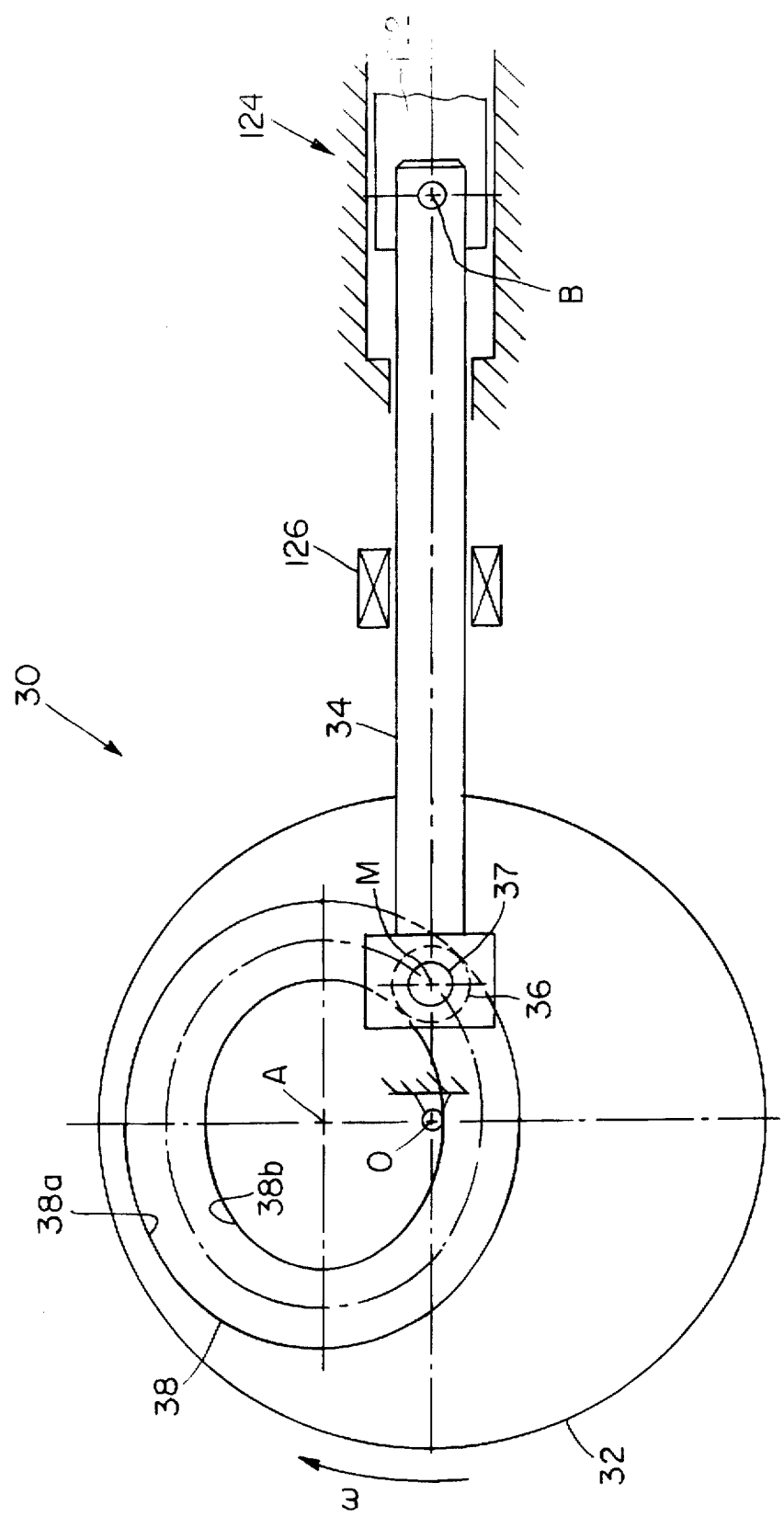

By making cam 32 having a cam profile as defined by Equation 15, displacer drive 30 will reciprocate in a true harmonic motion. FIGS. 3, 4 and 5 depict displacer drive 30 reciprocating displacer 122 with cam 32 being positioned at different rotational angles.

Figure 6:
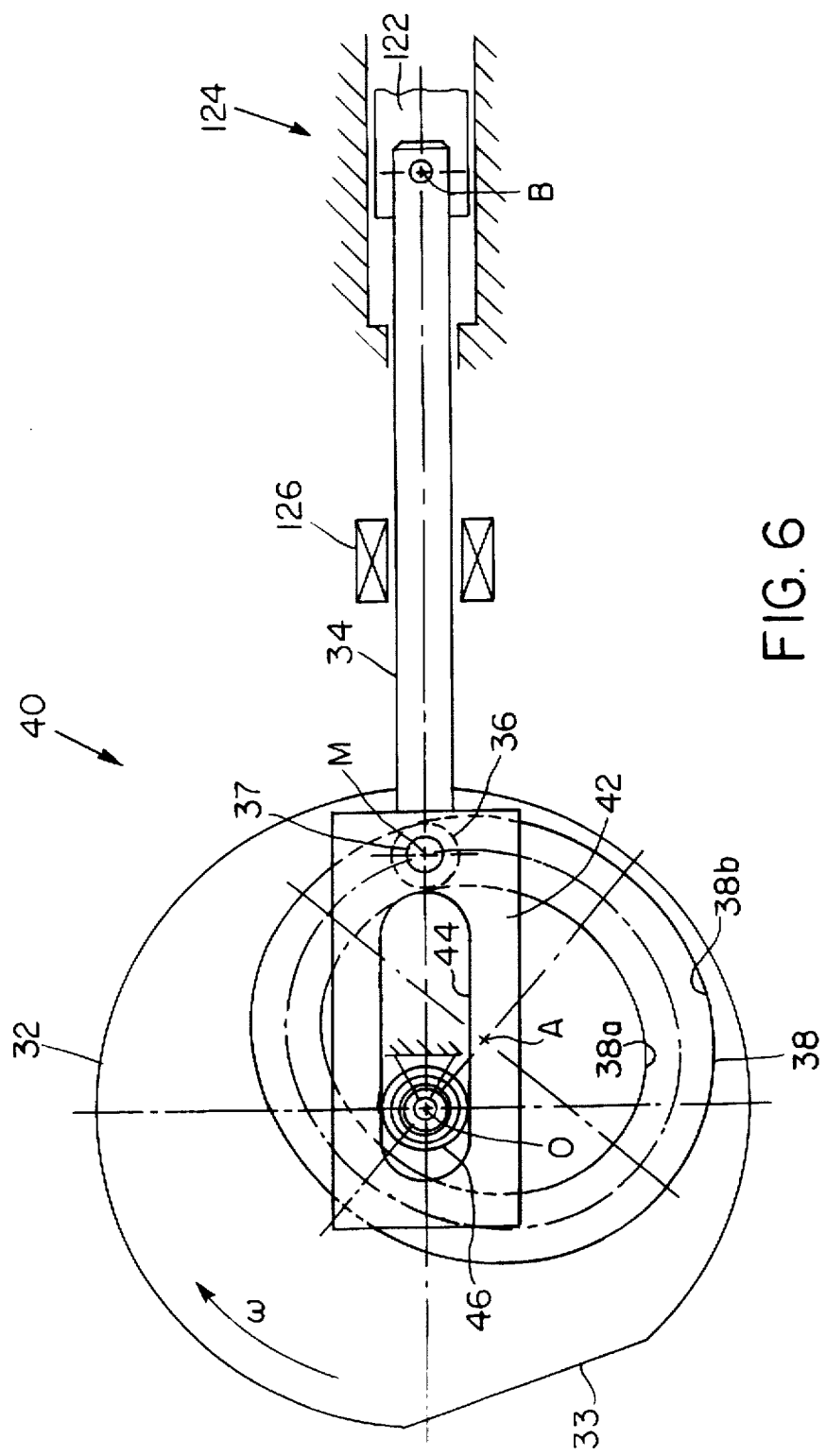
FIG. 6 is a schematic drawing of another preferred drive.

FIG. 6 depicts another preferred displacer drive 40 which differs from displacer drive 30 in that displacer drive 40 includes a support bracket 42 fixed to displacer rod 34. Support bracket 42 has an internal slot 44. A roller bearing 46 is mounted to the rotation point O of cam 32 and is slidingly engaged within internal slot 44. Roller bearing 46 provides a second support bearing for supporting displacer rod 34. By positioning bearing 46 on rotation point O, displacer drive 40 has the support of two bearings but still remains compact. The outer surface of cam 32 includes a flat 33 which provides visual aid in determining the rotational position of cam 32.

Figure 7:
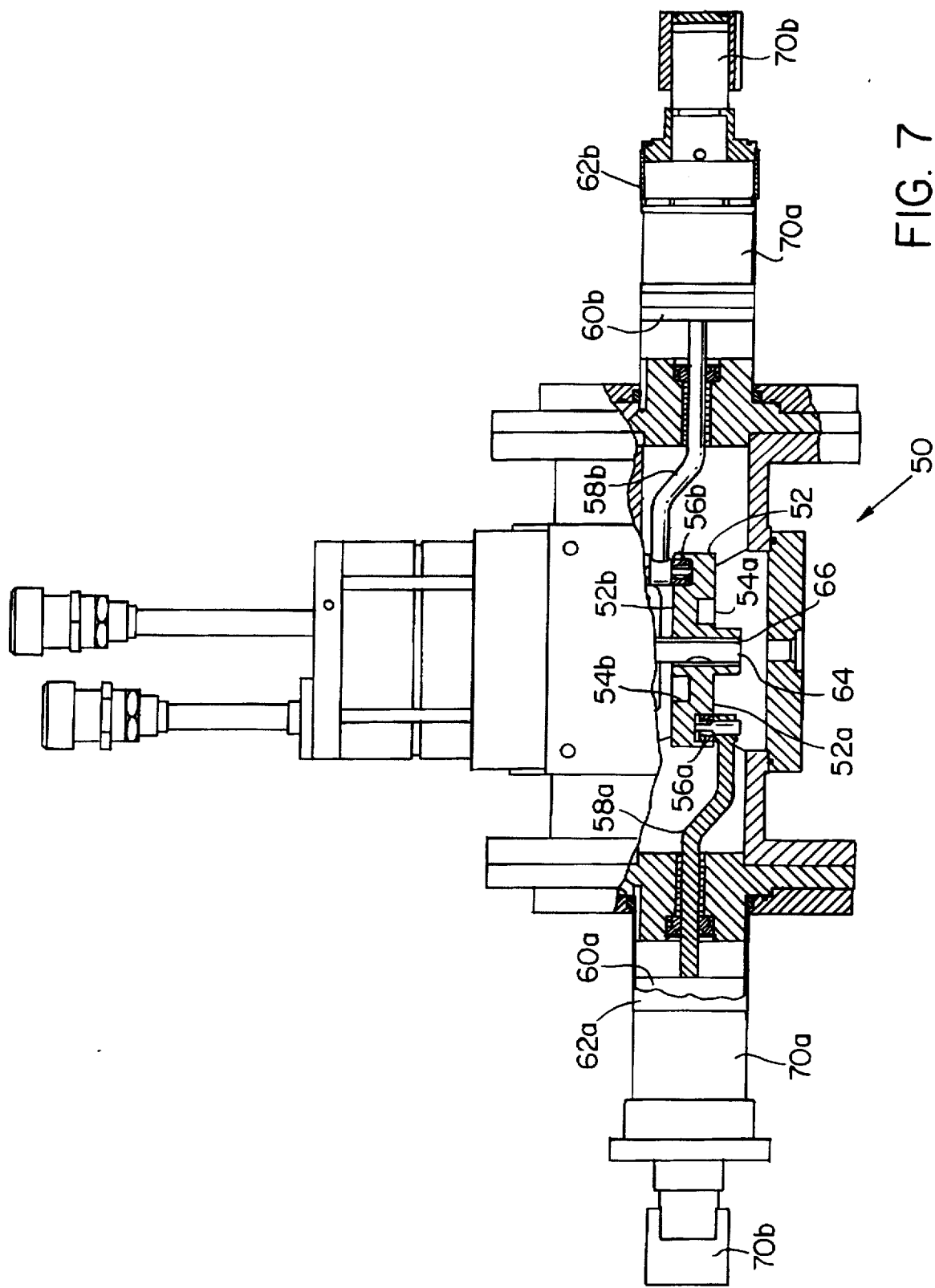
FIG. 7 is side view of yet another preferred drive with a portion of the housing broken away.

FIG. 7 depicts another preferred embodiment of the present invention in which a displacer drive 50 drives two opposed displacers 60a and 60b within respective expansion chambers 62a and 62b. The outer casing of expansion chamber 62a is shown partially removed while the outer casing of expansion chamber 62b is shown completely removed so that the components therein can be seen. Each displacer 60a and 60b has two heat stations 70a and 70b. The larger heat station 70a is at a higher temperature of about 80k while the smaller heat station 70b is at a lower temperature of about 10k. Station 70a cools the higher temperature array of a two stage cryopump while station 70b cools the lower temperature array.

Figure 10:
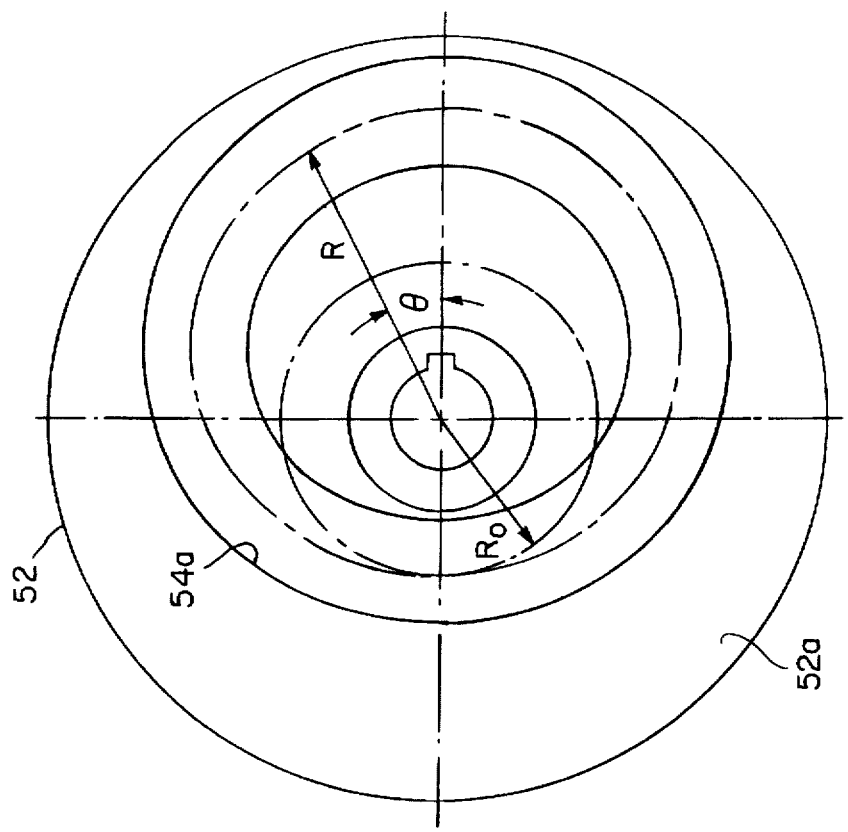
FIG. 10 is a front view of the cam of FIG. 8 depicting various parameters of the cam.
Figure 8:
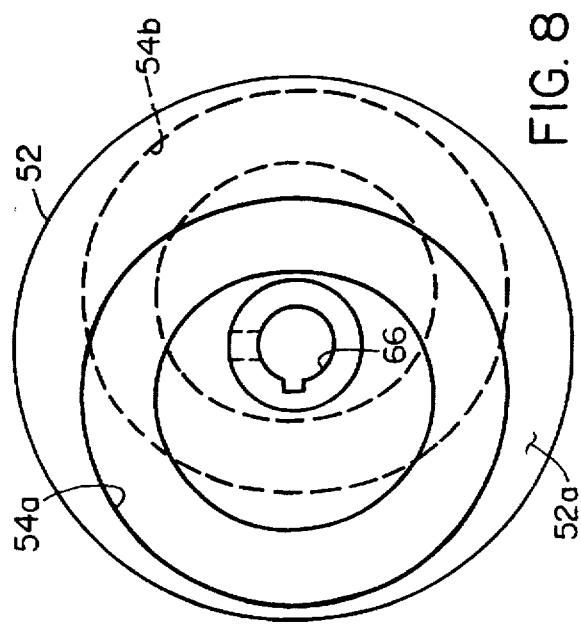
FIG. 8 is a front view of the cam employed in the drive of FIG. 7.
Figure 9:
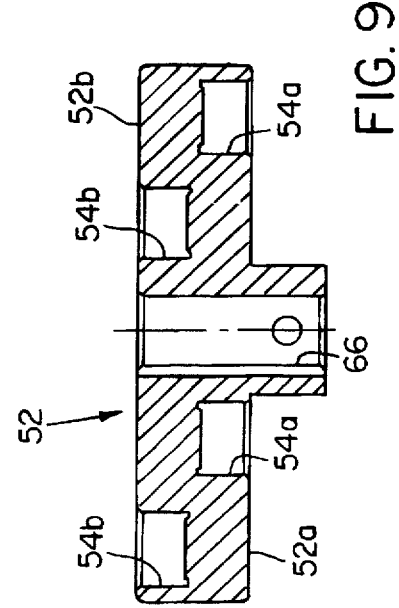
FIG. 9 is a side sectional view of the cam of FIG. 8.

Displacer drive 50 includes a cam 52 mounted to a drive shaft 64 through bore 66. FIGS. 8, 9 and 10 depict enlarged views of cam 52. Cam 52 has two faces 52a and 52b on opposing sides of the cam 52. Face 52a includes a cam groove 54a for capturing and driving cam follower 56a which in turn drives displacer rod 58a and displacer 60a within expansion chamber 62a. Face 52b includes a cam groove 54b for capturing and driving cam follower 56b which in turn drives displacer rod 58b and displacer 60b within expansion chamber 62b.

Cam grooves 54a and 54b have the same profile but are positioned 180° out of phase relative to each other on faces 52a and 52b such that displacers 60a and 60b are reciprocated simultaneously outwardly and inwardly. In other words, displacers 60a and 60b are driven outwardly at the same time and are also driven inwardly at the same time. This balances the dynamic forces of displacer drive 50 and reduces low frequency vibration. FIG. 8 depicts the position of cam grooves 54a and 54b in relation to each other. Although displacers 60a and 60b are preferably driven in line with each other, alternatively, displacers 60a and 60b can be driven at an angle relative to each other such as in a V-type configuration. For dynamic balancing, a third displacer or other mass would be required. Any number of masses may be driven at appropriate angles for dynamic balancing.

The profile for cam grooves 54a and 54b is preferably determined by the following harmonic motion equation:

$$R_p(\theta) = R_o + \frac{r_o}{2}(1 - \cos\theta) \quad \text{(Eq. 16)}$$

where:

$R_p$=the cam radius measured from the cam pivot or rotation point $\theta$=the rotational angle of cam 52

$R_o$=the radius of the prime circle of cam 52, and $r_o$=the stroke provided by cam 52 where $r_o=R_c-R_o$ at $\theta=0°$.

Equation 16 provides a motion which is similar to that provided by equation 15. An advantage of making a cam having a profile defined by Equation 16 (such as cam 52) is that the center of rotation of the cam is more coincident relative to the center of the area bounded by the cam groove in comparison to a cam having a profile defined by equation 15 (such as cam 32). This means that a cam having a profile defined by Equation 16 is more compact during rotation than a cam having profile defined by Equation 15. Consequently, the displacer drive can be made more compact.

Displacer drive 50 preferably has a prime circle radius of about 0.75 inches and a stroke $r_o$ of about 0.75 inches such that:

$$R_p(\theta)=0.75+0.375(1-\cos\theta). \quad \text{(Eq. 17)}$$

Alternatively, the dimensions of $R_o$ and $r_o$ can be varied depending upon the dimensions of the refrigerator.

Although displacer drive 50 has been shown to drive two displacers 60a and 60b, alternatively, one of the displacers and displacer rods can be replaced with a reciprocating balancing mass preferably equaling the mass of the displacer and displacer rod. The balancing mass reciprocates in unison with the associated cam follower. In this manner, the reciprocating motion of the single displacer is balanced by the reciprocating motion of the balancing mass. Although displacers 60a/60b and displacer rods 58a/58b are also balancing masses, the balancing mass described above differs in that it performs only a balancing function and does not expand refrigerants.

Equivalents

While this invention has been particularly shown and described with references to preferred embodiments thereof, it will be understood by those skilled in the art that various changes in form and details may be made therein without departing from the spirit and scope of the invention as defined by the appended claims. For example, the profile for cam 32 can be used in cam 52 and vice-versa. Additionally, other suitable cam profiles can be employed for cams 32 and 52 such as a high order polynomial equation which approximates Equations 15 and 16 or another sinusoidal equation. Examples of such equations can be found in "Theory of Machines and Mechanisms" by Joseph Edward Shigley and John Joseph Vicker, Jr., pages 207–226, © 1980 McGraw Hill, which is incorporated herein by reference in its entirety.

What is claimed is:

1. A drive for driving a first displacer in a cryogenic refrigerator comprising:

a rotatable cam having a first radially facing noncircular rotatable cam surface, the cam rotating about a pivot point;

a first cam follower contacting the first cam surface at a single radial location at any instant, rotational motion of the cam being converted into reciprocating motion of the first cam follower in a first direction, said first direction being radially oriented relative to the cam; and a first displacer rod coupled between the first cam follower and the first displacer for transferring the reciprocating motion of the first cam follower to the first displacer for driving the first displacer.

2. The drive of claim 1 in which the first cam follower comprises a roller having a center, the roller being rotatable about the center of the roller.

3. The drive of claim 2 in which the cam has a face, the first cam surface being an internal surface of a groove formed on the face of the cam, the groove for capturing the first cam follower.

4. The drive of claim 3 in which the first cam surface has a true harmonic motion profile.

5. The drive of claim 4 in which the first cam surface has a profile which is determined by the equation $$R(\theta) = \sqrt{l^2 + r^2 \sin^2\theta}$$

where R is the cam radius measured from a cam center, $\theta$ is the rotational angle of the cam, l is a configuration constant, and r is the distance between the cam center and the pivot point and is equal to ½ the stroke of the first displacer.

6. The drive of claim 1 in which the first displacer rod is supported by only one linear motion bearing.

7. The drive of claim 1 further comprising:

a first linear motion bearing for supporting the first displacer rod, the first linear motion bearing being positioned along the first displacer rod between the first cam follower and the first displacer; and a second linear motion bearing for supporting the first displacer rod, the second linear motion bearing being positioned at the pivot point of the cam.

8. The drive of claim 1 further comprising:

a second radially facing noncircular rotatable cam surface on the cam;

a second cam follower contacting the second cam surface at a single radial location at any instant, rotational motion of the cam being converted into reciprocating motion of the second cam follower in a second direction, said second direction being radially oriented relative to the cam; and a balancing mass coupled to the second cam follower, the balancing mass reciprocating in unison with the second cam follower.

9. The drive of claim 1 further comprising:

a second radially facing noncircular rotatable cam surface on the cam;

a second cam follower contacting the second cam surface at a single radial location at any instant, rotational motion of the cam being converted into reciprocating motion of the second cam follower in a second direction, said second direction being radially oriented relative to the cam; and a second displacer rod coupled between the second cam follower and a second displacer for transferring the reciprocating motion of the second cam follower to the second displacer for driving the second displacer.

10. The drive of claim 9 in which the first and second cam surfaces are located on respective first and second faces of the cam, the first and second cam surfaces being positioned 180° out of phase relative to each other such that the first and second displacers are reciprocated outwardly and inwardly in unison.

11. The drive of claim 10 in which the first and second cam surfaces each have a profile which is determined by the equation $$R_p(\theta) = R_o + \frac{r_o}{2}(1 - \cos\theta)$$

where $R_p$ is the cam radius measured from the cam pivot point, $\theta$ is the rotational angle of the cam, $R_o$ is the radius of the prime circle of the cam and $r_o$ is the stroke of the displacer.

12. The drive of claim 10 in which the first and second displacers are positioned along a common axis.

13. A drive for driving first and second displacers in a cryogenic refrigerator comprising:

a rotatable cam having first and second radially facing noncircular rotatable cam surfaces, the cam rotating about a pivot point;

a first cam follower contacting the first cam surface at a single radial location at any instant;

a second cam follower contacting the second cam surface at a single radial location at any instant, rotational motion of the cam being converted into reciprocating motion of the first and second cam followers in first and second directions, said first and second directions each being radially oriented relative to the cam;

a first displacer rod coupled between the first cam follower and the first displacer; and a second displacer rod coupled between the second cam follower and a second displacer, the first and second displacer rods for transferring the reciprocating motion of the first and second cam followers to the first and second displacers for driving the first and second displacers.

14. The drive of claim 13 in which the first and second cam surfaces are located on respective first and second faces of the cam, the first and second cam surfaces being positioned 180° out of phase relative to each other such that the first and second displacers are reciprocated outwardly and inwardly in unison.

15. The drive of claim 14 in which the first and second cam surfaces each have a profile which is determined by the equation $$R_p(\theta) = R_o + \frac{r_o}{2}(1 - \cos\theta)$$

where $R_p$ is the cam radius measured from the cam pivot point, $\theta$ is the rotational angle of the cam, $R_o$ is the radius of the prime circle of the cam and $r_o$ is the stroke of the displacer.

16. The drive of claim 14 in which the first and second displacers are positioned along a common axis.

17. A method of driving a first displacer in a cryogenic refrigerator comprising the steps of:

rotating a cam about a pivot point, the cam having a first radially facing noncircular rotatable cam surface;

contacting the first cam surface at a single radial location at any instant with a first cam follower, the rotational motion of the cam being converted into reciprocating motion of the first cam follower in a first direction, said first direction being radially oriented relative to the cam; and coupling a first displacer rod between the first cam follower and the first displacer for transferring the reciprocating motion of the first cam follower to the first displacer for driving the first displacer.

18. The method of claim 17 in which the cam has a face, the first cam surface being an internal surface of a groove formed on the face of the cam, the method further comprising the step of capturing the first cam follower within the groove.

19. The method of claim 17 further comprising the step of providing the first cam surface with a true harmonic motion profile.

20. The method of claim 19 in which the first cam follower comprises a roller having a center, the roller being rotatable about the center of the roller, the method further comprising the step of providing the first cam surface with a profile which is determined by the equation $$R(\theta) = \sqrt{l^2 + r^2 \sin^2\theta}$$

where R is the cam radius measured from a cam center, θ is the rotational angle of the cam, l is a configuration constant, and r is the distance between the cam center and the pivot point and is equal to ½ the stroke of the displacer.

21. The method of claim 17 further comprising the step of supporting the first displacer rod with only one linear motion bearing.

22. The method of claim 17 further comprising the steps of:
providing the cam with a second radially facing noncircular rotatable cam surface;
contacting the second cam surface at a single radial location at any instant with a second cam follower, the rotational motion of the cam being converted into reciprocating motion of the second cam follower in a second direction, said second direction being radially oriented relative to the cam; and
coupling a balancing mass to the second cam follower, the balancing mass reciprocating in unison with the second cam follower.

23. The method of claim 17 further comprising the steps of:
providing the cam with a second radially facing noncircular rotatable cam surface;
contacting the second cam surface at a single radial location at any instant with a second cam follower, the rotational motion of the cam being converted into reciprocating motion of the second cam follower in a second direction, said second direction being radially oriented relative to the cam; and
coupling a second displacer rod between the second cam follower and a second displacer for transferring the reciprocating motion of the second cam follower to the second displacer for driving the second displacer.

24. The method of claim 23 further comprising the steps of:
locating the first and second cam surfaces on respective first and second faces of the cam; and
positioning the first and second cam surfaces 180° out of phase relative to each other such that the first and second displacers are reciprocated outwardly and inwardly in unison.

25. The method of claim 24 further comprising the step of providing the first and second cam surfaces each with a profile which is determined by the equation $$R_p(\theta) = R_o + \frac{r_o}{2}(1 - \cos\theta)$$

$R_p$ is the cam radius measured from the cam pivot point, θ is the rotational angle of the cam, $R_o$ is the radius of the prime circle of the cam and $r_o$ is the stroke of the displacer.

26. The method of claim 23 further comprising the step of positioning the first and second displacers along a common axis.

27. A drive for driving a first displacer in a cryogenic refrigerator comprising:
a rotatable cam having a first rotatable cam surface, the cam rotating about a pivot point, the cam having a face, the first cam surface being an internal surface of a groove formed on the face of the cam, the groove for capturing the first cam follower, the first cam surface having a true harmonic motion profile which is determined by the equation $$R(\theta) = \sqrt{l^2 + r^2 \sin^2\theta}$$

where R is the cam radius measured from a cam center, θ is the rotational angle of the cam, l is a configuration constant, and r is the distance between the cam center and the pivot point and is equal to ½ the stroke of the first displacer;
a first cam follower contacting the first cam surface, the first cam follower comprising a roller having a center, the roller being rotatable about the center of the roller, rotational motion of the cam being converted into reciprocating motion of the first cam follower; and
a first displacer rod coupled between the first cam follower and the first displacer for transferring the reciprocating motion of the first cam follower to the first displacer for driving the first displacer.

28. A drive for driving a first displacer in a cryogenic refrigerator comprising:
a rotatable cam having a first rotatable cam surface, the cam rotating about a pivot point;
a first cam follower contacting the first cam surface, rotational motion of the cam being converted into reciprocating motion of the first cam follower;
a first displacer rod coupled between the first cam follower and the first displacer for transferring the reciprocating motion of the first cam follower to the first displacer for driving the first displacer;
a first linear motion bearing for supporting the first displacer rod, the first linear motion bearing being positioned along the first displacer rod between the first cam follower and the first displacer; and
a second linear motion bearing for supporting the first displacer rod, the second linear motion bearing being positioned at the pivot point of the cam.

29. A method of driving a first displacer in a cryogenic refrigerator comprising the steps of:
rotating a cam about a pivot point, the cam having a first rotatable cam surface;
providing the first cam surface with a true harmonic motion profile which is determined by the equation $$R(\theta) = \sqrt{l^2 + r^2 \sin^2\theta}$$

where R is the cam radius measured from a cam center, θ is the rotational angle of the cam, l is a configuration constant, and r is the distance between the cam center and the pivot point and is equal to ½ the stroke of the displacer;
contacting the first cam surface with a first cam follower, the first cam follower comprising a roller having a center, the roller being rotatable about the center of the roller; the rotational motion of the cam being converted into reciprocating motion of the first cam follower; and coupling a first displacer rod between the first cam follower and the first displacer for transferring the reciprocating motion of the first cam follower to the first displacer for driving the first displacer.

* * * * *